United States Patent
Umholtz et al.

(10) Patent No.: US 10,810,331 B2
(45) Date of Patent: Oct. 20, 2020

(54) SYSTEM FOR PREDICTING INDUCED SEISMICITY POTENTIAL RESULTING FROM INJECTION OF FLUIDS IN NATURALLY FRACTURED RESERVOIRS

(71) Applicant: FracGeo LLC, The Woodlands, TX (US)

(72) Inventors: Nicholas Moehle Umholtz, Pekin, IL (US); Ahmed Ouenes, Centennial, CO (US)

(73) Assignee: FracGeo, LLC, The Woodlands, TX (US)

( * ) Notice: Subject to any disclaimer, the term of this patent is extended or adjusted under 35 U.S.C. 154(b) by 496 days.

(21) Appl. No.: 15/416,165

(22) Filed: Jan. 26, 2017

(65) Prior Publication Data

US 2017/0132339 A1    May 11, 2017

Related U.S. Application Data

(63) Continuation-in-part of application No. 15/045,861, filed on Feb. 17, 2016.
(Continued)

(51) Int. Cl.
*G06F 30/20* (2020.01)
*E21B 43/26* (2006.01)
*G06F 17/11* (2006.01)

(52) U.S. Cl.
CPC ............ *G06F 30/20* (2020.01); *E21B 43/26* (2013.01); *G06F 17/11* (2013.01)

(58) Field of Classification Search
CPC ....... G06F 17/5009; G06F 17/11; E21B 43/26
(Continued)

(56) References Cited

U.S. PATENT DOCUMENTS 6,928,367 B2    8/2005    Gray et al.
7,925,482 B2    4/2011    Kennon et al.
(Continued)

OTHER PUBLICATIONS

C.L. Cipolla et. al., Hydraulic Fracture Monitoring to Reservoir Simulation: Maximizing Value, SPE 133877, pp. 1-26. 2010. (Year: 2010).*
(Continued)

*Primary Examiner* — Justin C Mikowski
(74) *Attorney, Agent, or Firm* — Dorr, Carson & Birney PC

(57) ABSTRACT

A method for minimizing the risk of induced seismicity from injection of fluids into a naturally fractured reservoir uses a meshless particle-based simulation to quantify the heterogeneity in energy storage within the reservoir. In particular, this methodology creates an equivalent fracture model from data on the natural fracture density, regional stress, pore pressure and elastic properties of the reservoir, in which points in the reservoir have a fracture length and fracture orientation. A meshless particle-based method is then employed to simulate the geomechanical interaction between regional stress and natural fractures to estimate the stress anisotropy and strain (e.g., differential stress and shear strain). The induced seismicity potential is then calculated at points in the reservoir based on the estimated stress anisotropy and strain. A zone for injection of fluids into the reservoir can be selected by identifying a large area of the reservoir having low induced seismicity potential.

6 Claims, 14 Drawing Sheets

Related U.S. Application Data

(60) Provisional application No. 62/291,618, filed on Feb. 5, 2016, provisional application No. 62/207,569, filed on Aug. 20, 2015.

(58) Field of Classification Search
USPC .......................................................... 703/10
See application file for complete search history.

(56) References Cited

U.S. PATENT DOCUMENTS

| | | | |
|---|---|---|---|
| 8,126,689 | B2 | 2/2012 | Soliman et al. |
| 8,412,500 | B2 | 4/2013 | Weng et al. |
| 2011/0125476 | A1 | 5/2011 | Craig |
| 2011/0182144 | A1* | 7/2011 | Gray .................. G01V 1/30 367/75 |
| 2013/0096890 | A1 | 4/2013 | Vanderheyden et al. |
| 2013/0191044 | A1* | 7/2013 | Maerten ............. G06F 17/00 702/42 |
| 2014/0067353 | A1 | 3/2014 | Shelley et al. |
| 2015/0204174 | A1* | 7/2015 | Kresse ............... E21B 43/26 166/250.01 |
| 2016/0108705 | A1* | 4/2016 | Maxwell ............ E21B 43/267 166/250.1 |

OTHER PUBLICATIONS

Xavier Garcia-Teijeiro and Adrian Rodriguez-Herrera, Dependence of Stress-induced Micro-seismicity on Natural Fracture Properties and In-situ Stress, SPE 171632 MS, pp. 1-12, 2014. (Year: 2014).*

Ahmed Ouenes and Yamina Aimene, John Nairn, Interpretation of Microseismic Using Geomechanical Modeling of Multiple Hydraulic Fractures Interacting with Natural Fractures—Application to Montney Shale, CSEG Recorder Nov. 2014, pp. 46-54. (Year: 2014).*

Ahmed Ouenes and Yamina Aimene, John Nairn, Predicting Microseismicity from Geomechanical Modeling of Multiple Hydraulic Fractures Interacting with Natural Fractures—Application to the Marcellus and Eagle Ford, Aug. 2014, Unconventional Resources Technology Conference, pp. 1-20. (Year: 2014).*

Aimene et al., "Modeling Multiple Hydraulic Fractures Interacting With Natural Fractures Using the Material Point Method", SPE/EAGE European Unconventional Conference & Exhibition, Vienna, Austria (SPE 167801) (Feb. 2014).

Zellou et al., "Improved Fractured Reservoir Characterization Using Neural Networks," Geomechanics and 3-D Seismic., Society of Petroleum Engineers. doi:10.2118/30722-MS (Jan. 1, 1995).

Ouenes, "Practical Application of Fuzzy Logic and Neural Networks to Fractured Reservoir Characterization," Computer and Geosciences, 26, 953-962 (2000).

Olson, "Joint Pattern Development: Effects of Subcritical Crack Growth and Mechanical Crack Interaction," Journal of Geophysical Research, vol. 98, Issue B7, p. 12251-12265 (1993).

Chilès, "Fractal and Geostatistical Methods for Modeling of a Fracture Network," Mathematical Geology, 20 (6):631-654 (1988).

Grossman et al., "Integration of Multicomponent Time-Lapse Processing and Interpretation: Focus on Shear-Wave Splitting Analysis," The Leading Edge, (Jan. 2013).

Bonneau et al., "A Methodology for Pseudo-Genetic Stochastic Modeling of Discrete Fracture Networks," Computers & Geosciences, 56, 12-22 (2013).

Nairn, "Material Point Method Calculations with Explicit Cracks," Computer Modeling in Engineering & Science (CMES), vol. 4, No. 6, pp. 649-663 (2003).

Liu et al., "Geological Characterization of Naturally Fractured Reservoirs Using Multiple Point Geostatistics," Society of Petroleum Engineers. doi:10.2118/75246-MS (2002).

Ouenes et al., "Integrated Fractured Reservoir Modeling Using Both Discrete and Continuum Approaches," Society of Petroleum Engineers. doi:10.2118/62939-MS (2000).

Sulsky et al., "A Particle Method for History-Dependent Materials," Computer Methods in Applied Mechanics and Engineenng, 118, 179-196 (1994).

* cited by examiner

To Fig. 6b

SYSTEM FOR PREDICTING INDUCED SEISMICITY POTENTIAL RESULTING FROM INJECTION OF FLUIDS IN NATURALLY FRACTURED RESERVOIRS

RELATED APPLICATION

The present application is based on and claims priority to the Applicant's U.S. Provisional Patent Application 62/291,618, entitled "System for Predicting Induced Seismicity Potential Resulting from Injection of Fluids in Naturally Fractured Reservoirs," filed on Feb. 5, 2016. The present application is also a continuation-in-part of the Applicant's co-pending U.S. patent application Ser. No. 15/045,861, entitled "System For Hydraulic Fracturing Design And Optimization In Naturally Fractured Reservoirs," filed on Feb. 17, 2016, which is based on and claims priority to U.S. Provisional Patent Application 62/207,569, filed on Aug. 20, 2015.

BACKGROUND OF THE INVENTION

Field of the Invention. The present invention relates generally to the field of geomechanical modeling. More specifically, the present invention discloses a system for an induced seismicity prediction model to be used when fluids are injected in naturally fractured reservoirs for the purpose of water disposal or hydraulic fracturing.

Background of the Invention. The statements in this section merely provide background information related to the present disclosure and may not constitute prior art.

Large hydrocarbons resources are locked around the world in unconventional reservoirs such as tight sands, tight carbonates, and shale reservoirs all characterized by an intrinsic very low permeability that does not allow the natural flow of oil or gas to the drilled wellbores. Producing these unconventional hydrocarbons is achieved by primarily hydraulic fracturing which artificially creates the necessary permeability by pumping certain fluids into the wellbore to break the rock and create a complex network of induced fractures. The fluids from such efforts, and fluids other than petroleum originally bound in the reservoir, must eventually be produced from the well, and must ultimately be disposed of. In many cases, the water is sequestered underground utilizing Underground Injection Control well programs. Such injections, especially of high volumes and in certain stratigraphic units, have recently been linked to the increasing occurrence of earthquakes. Earthquakes are the energy released as surface waves associated with the short term release of long-term stress buildups, primarily along discontinuities, within the earth's crust.

In a subterranean reservoir, the weight of the overburden and most often tectonic activities gives rise to vertical and horizontal stresses that create natural fractures. In its turn the resulting natural fracture system interacts with the regional stress to create a heterogeneous stress field with locally varying maximum horizontal stresses and stress anisotropy. When injection of fluids is initiated in a wellbore in this heterogeneous stress field perturbed by the natural fractures, there is probability to induce a large seismic event. The potential role played by the natural fractures and varying subsurface pressures in the process of injection and its impact on the preexisting stress fields from the wellbore has been noted by authors in the field. However, the actual modeling of the interactions between regional fault systems and stresses with these pressures has been absent.

Various computational methods have been used to model mechanical processes associated with unconventional petroleum production. These methods include finite elements, finite difference, boundary elements, block spring model, extended finite element, distinct element method, hybrid finite/discrete elements, and particle methods. Unfortunately, most of these computational methods do not use a realistic description of the natural fractures driven by geophysical and geologic constraints, and do not account for the multitude of interactions which occur between multiple fractures and the stress fields.

As a result the current computational methods taken separately are not able to predict either microseismicity or large-scale seismic events. This lack of a mechanistic model that is able to be validated with microseismic or seismic data, hampers the ability to predict the mechanical effects of large-scale underground injection and other similar practices which may alter existing stress fields. Foremost among the deficiencies of the current methods is their inability to seamlessly input, prior to any simulation of injection, the proper initial geomechanical conditions that are the result of the interaction between the regional stress, pore pressure, and the natural fractures. These initial conditions are sometimes simulated in other geomechanical software which most frequently do not account for the detailed natural fracture model and its impact on the initial stress field and maximum principal stress direction that play a major role as the proper initial conditions prior to any realistic simulation of the hydraulic fracturing where the interaction between hydraulic and natural fractures are accounted for. As a result of these technical challenges, conventional modeling technologies and software have been unable to provide the necessary information needed to prevent the occurrence of destructive earthquakes induced by high volume injections that are used in water disposal and hydraulic fracturing. Recent escalation in the occurrence of earthquakes in the mid-continent North America has highlighted this need. One possible cause of the poor placement of the water disposal wellbores and completion stages is the unavailability of technologies that allow the rapid identification and mapping of geomechanical sweet spots where the wells should be drilled and injection volumes selected. Providing a means for estimating the differential stress in a subterranean formation would assist in defining and mapping these geomechanical sweet spots.

Until recently, two approaches have been used conventionally by shale operators to estimate differential stress for the purpose of drilling and completion. The most common approach relies on well logging using various types of dipole sonic logs. Although logging tools can be very useful, they are of limited use once the well is drilled since the driller cannot change its position if it encounters many areas of high differential stress that will not provide successful completion stages or safe zones for water disposal. Another approach is needed to estimate the differential stress across the entire study area before any well is drilled and logged. To accomplish this goal, the present invention uses other methods that could provide the differential stress prediction over a larger scale.

Prior-art approaches have plotted fault systems within a constant regional stress field to evaluate their critical nature, or propensity to activate. In this approach, the scope of these inquiries are limited only to the faults themselves, and not the rest of the region, and ignores the heterogeneity in the stress field caused by the fault networks and the complex interaction they create as a result of their connections in different directions. An alternative method to capture across an entire region the propensity for seismic events as a result of stress field heterogeneity stemming from preexisting faults and fault networks is proposed in the present disclosure.

Accordingly, there remains a need for developing a robust workflow that combines in a mechanistic model a well constrained fault model, delivered through geologic and geophysical efforts, and geomechanics to capture the heterogeneity and potential energy storage within the earth's crust. In an effort to predict the variable probability of a geographic region producing a seismic event when subjected to stress field perturbation as a result of injection of fluids or other practices.

SUMMARY OF THE INVENTION

This invention provides a system for quantifying the heterogeneity in energy storage within a faulted region of the earth's crust in order to predict areas of elevated risk of seismic expression. Geologic, geophysical and engineering data is initially gathered and processed to estimate the distribution of the large scale natural fractures, pore pressure and the reservoir elastic properties in each geologic layer. Stress data is gathered and processed utilizing the derived distribution of large scale natural fractures, pore pressure and elastic properties in a mesh-free particle based geomechanical simulator to simulate the geomechanical interaction between the regional stress and the natural fractures, pore pressure and elastic properties to estimate horizontal differential stress and maximum principal stress directions. The mesh-free particle based geomechanical simulator can use as input an explicit 2D or 3D description of the natural fractures. The input pore pressure distribution could be measured and then interpolated or simulated with appropriate fluid flow simulators. The geomechanical results include the computation of the normalized horizontal differential stress maps and local maximum principal stresses and shear strain components to constrain the energy stored in the system, and the possibility of failure and release of said energy. The predictive capabilities of the geomechanical results are validated with actual microseismic events recorded during hydraulic fracturing and historical earthquake epicenter data.

A major feature of the present invention is its ability to first combine the continuous representation of the natural fractures as a 2D map derived from multiple sources and then transformed into an equivalent fracture model where natural fractures are represented by segments of certain lengths and orientations, which are used as input into a meshless particle based method geomechanical simulator able to represent explicitly the natural fractures. Additionally discrete fault lines may also be imposed on the model. Another major feature is the ability to model in the mesh-free particle-based method the interaction between the regional stress with the fracture model to quickly yield (i.e., in only few hours) normalized horizontal differential stress maps and local maximum principal stress directions, which are primary drivers of the induced seismicity prediction model.

These and other advantages, features, and objects of the present invention will be more readily understood in light of the following detailed description and drawings.

BRIEF DESCRIPTION OF THE DRAWINGS

The present invention can be more readily understood in conjunction with the accompanying drawings, in which.

DETAILED DESCRIPTION OF THE INVENTION

Figure 1:
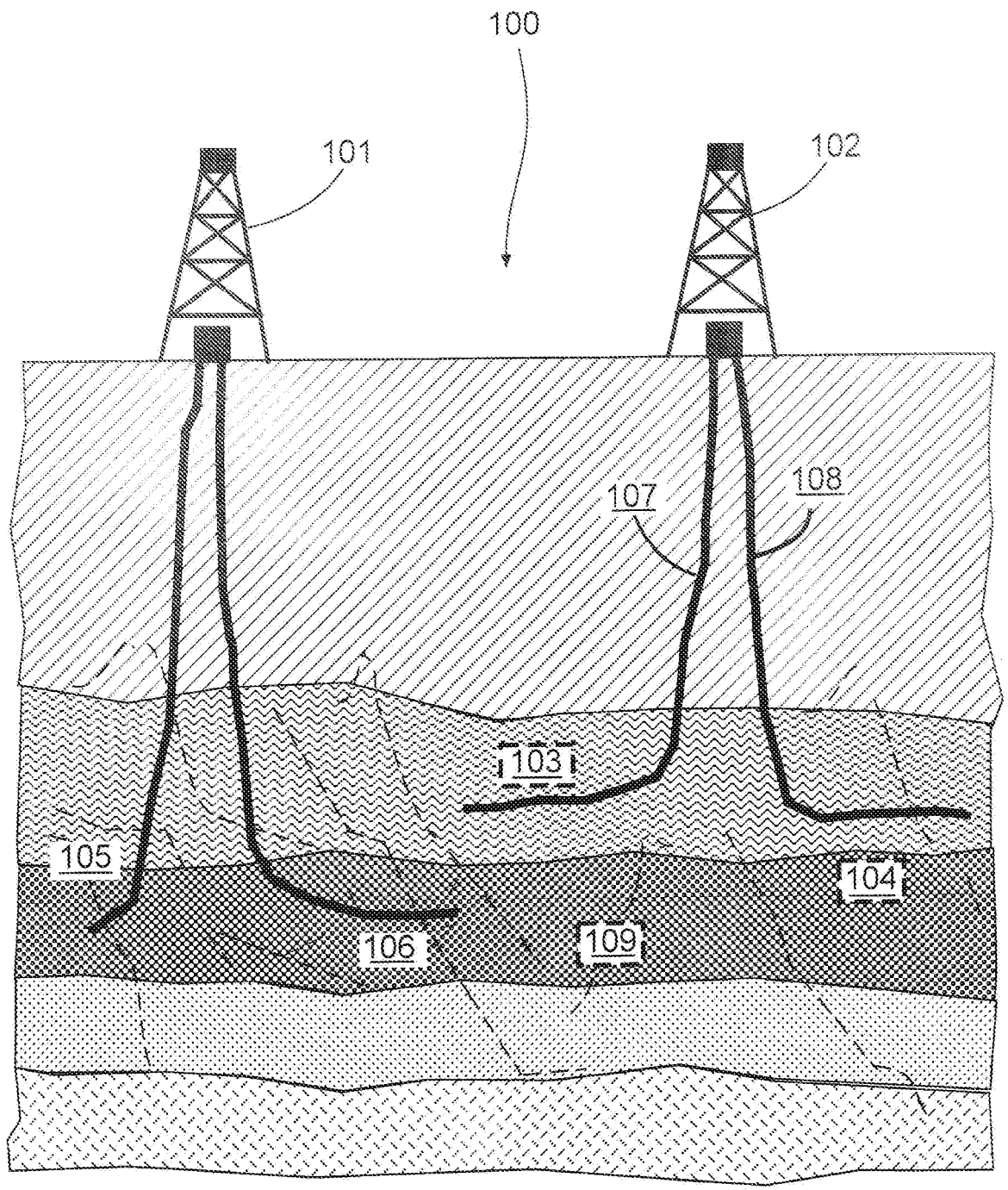
FIG. 1 is a diagrammatic representation of a cross section in a pad drilling scenario where four wellbores are drilled in different directions and in different fractured subterranean reservoirs from two pads.

For the purposes of promoting an understanding of the principles of the present invention, reference will now be made to the embodiments illustrated in the drawings, and specific language will be used to describe the same. It is nevertheless understood that no limitation to the scope of the disclosure is intended. Any alterations and further modifications to the described methods, devices, and systems, and any further application of the principles of the present disclosure are fully contemplated and included within the present disclosure as would normally occur to one skilled in the art to which the disclosure relates. In particular, it is fully contemplated that the steps, features or components described with respect to one embodiment may be combined with the steps, features or components described with respect to other embodiments of the present disclosure. For the sake of brevity, however, the numerous iterations of these combinations will not be described separately.

Referring initially to FIG. 1, a cross section 100 is shown extending across two well surface locations 101 and 102. The surface location 101 has two horizontal wellbores 105 and 106 drilled in the fractured subterranean reservoir 104 and another surface location 102 has two other horizontal wells 107 and 108 drilled in another fractured subterranean reservoir 103. The regions 104 and 103 may include a natural fracture network 109 that extends through one or more subterranean geologic formations.

Figure 2:
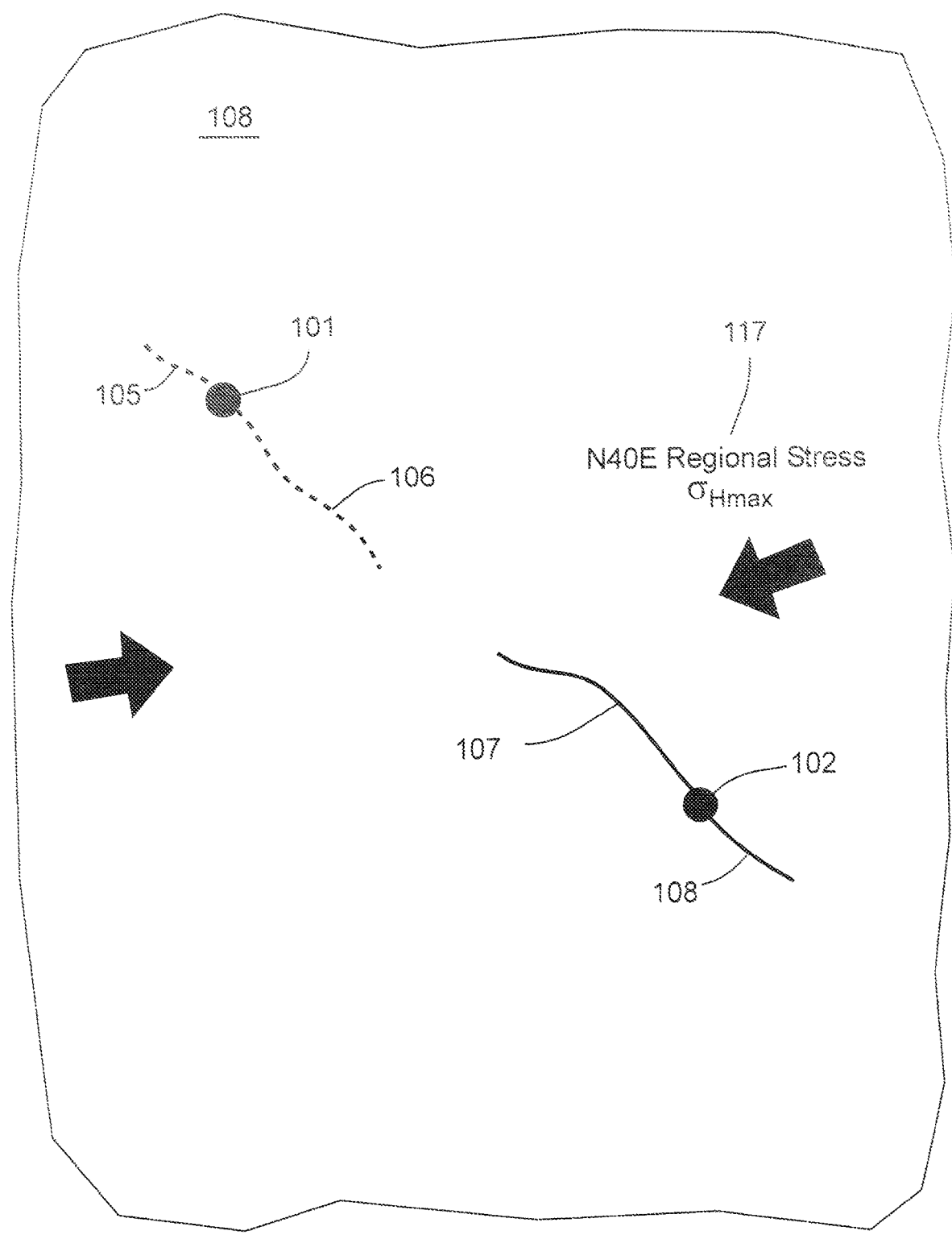
FIG. 2 is a diagrammatic representation of an aerial view of a pad drilling scenario where multiple pads, each with multiple wellbores, are drilled in different directions.

Generally, the cross section 100 is representative of any type of field 110 shown in FIG. 2 where natural resources are obtained. In some particular instances, the field 110 is an oil field, natural gas field, geothermal field, or other natural resources field where multiple surfaces locations 101, 102 are used to drill multiple wellbores 105, 106, 107, 108, and 111. The horizontal wellbores are frequently drilled in the direction perpendicular to the regional maximum horizontal stress direction 117 (as shown in FIG. 2) to allow for the development of transverse hydraulic fractures that will grow from the wellbore and in the direction of the maximum horizontal stress 117. In this regard, FIG. 2 shows the location of completed and stimulated horizontal wells 107 (each showing a continuous line for the completed and stimulated wellbore), and the location of drilled but not completed wells 106 (each showing a semi-dashed line for the undrilled wells). As will be discussed below, in some instances data regarding the drilled and completed wells 107 is utilized in different steps of the workflow to estimate different geomechanical results that could be used to optimize the placement of high volume injection water disposal in well 105 and 106.

Surface seismic data can be available or not in the field 110. If available, the surface seismic data can be combined with well data to delimit the boundaries of regions 104 and 103 as well as provide information on the elastic properties, the in-situ stress, and the reservoir fluids that affect the propagation of seismic waves in the regions 104 and 103.

Figure 3:
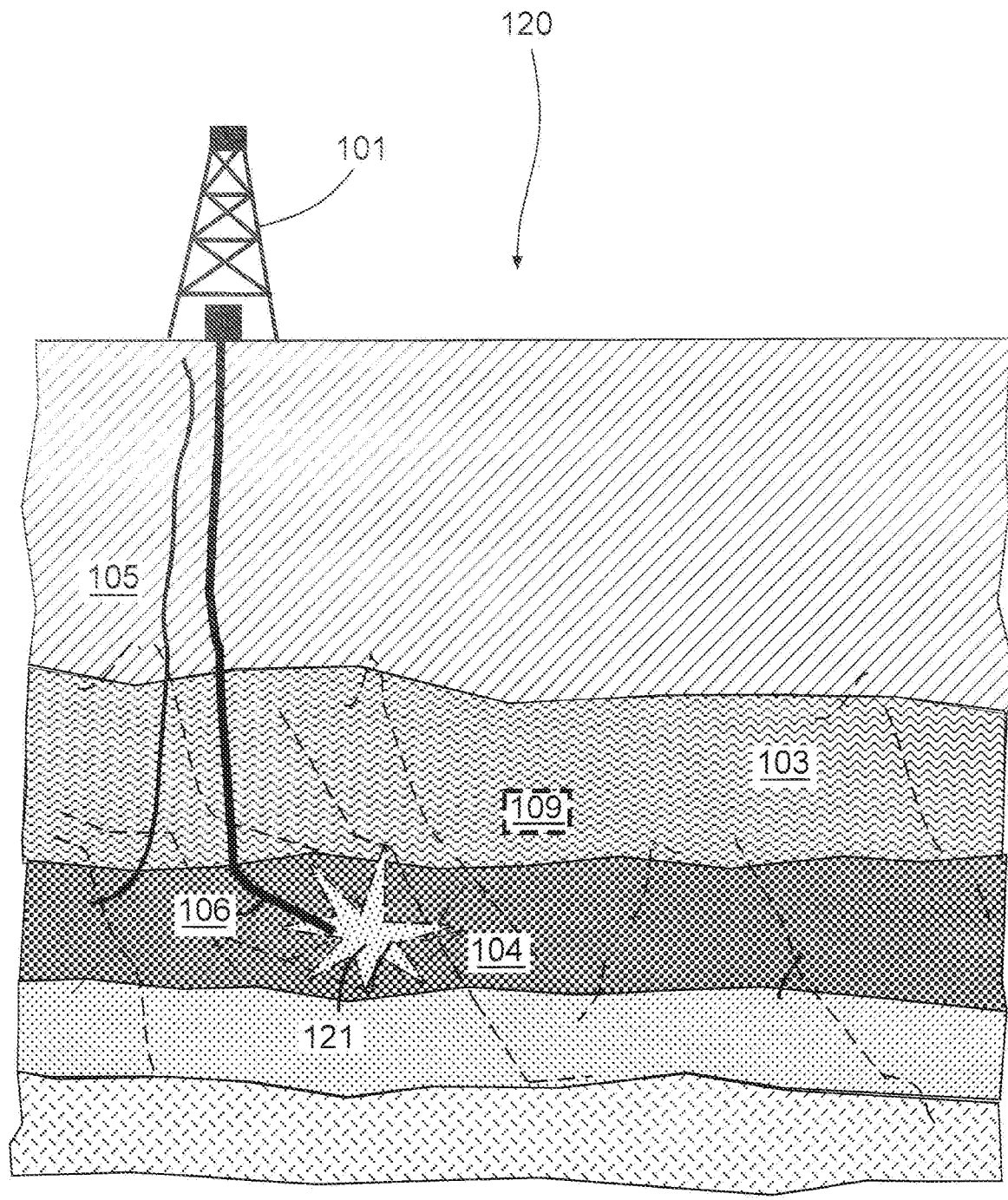
FIG. 3 is a diagrammatic representation of injection stage interaction with natural fractures in a fractured subterranean reservoir along a wellbore.

FIG. 3 shows a wellbore 106 that has been drilled, but not completed and stimulated, crossing a fractured subterranean region 104. Surface drilling data adequately processed and multiple logs measuring rock properties are run along wellbore 106 and can be used in the disposal well site selection process. Wellbore geometry, surface drilling adequately processed and various sonic logs run along the wellbore 106 provide stress information that could be used in the workflow. In some implementations, the well 101 is used to apply an injection treatment in the subterranean formation 104 through the wellbore 106. The example well 101 may be used to create a complex hydraulic fracture 121 in wellbore 106. Properties of the injection treatment can be calculated or selected based on computer simulations of complex hydraulic fracture 121 propagation and interaction with the natural fracture network 109 in the subterranean region 104. The location of hydraulic fractures 121 may be selected to minimize stress field perturbation and monitored and validated using seismic or microseismic data.

During the injection of wellbore 106, geophones or other types of listening equipment placed inside existing wellbores, at the surface or beneath it can be used to sense microseismic information. A major geologic factor creating these stress variations is the presence of the natural fractures system 109 that interacts with the regional stress and its maximum horizontal stress direction 117. The objective of the present invention is to provide a reliable and rapid way to evaluate the geomechanical sweet spots where the injection will be least likely perturb existing stress fields to the point of creating major seismic events that can be felt by the surrounding communities. These geomechanical sweet spots could be identified by estimating the horizontal differential stress and the shear strain components in each subterranean fractured formation 103 and 104 across the field 110. The present invention provides a new way to estimate quickly the effects of the interaction between the natural fracture system 109 and the regional stress and its maximum horizontal stress direction 117. Having the differential stress map, an operator will be able to drill wellbores and place injection stages mostly in the zones where low differential and shear strain zones are predicted, which will help to ensure the safe injection of fluids for water disposal or hydraulic fracturing with minimal induced seismicity potential.

Figure 4:
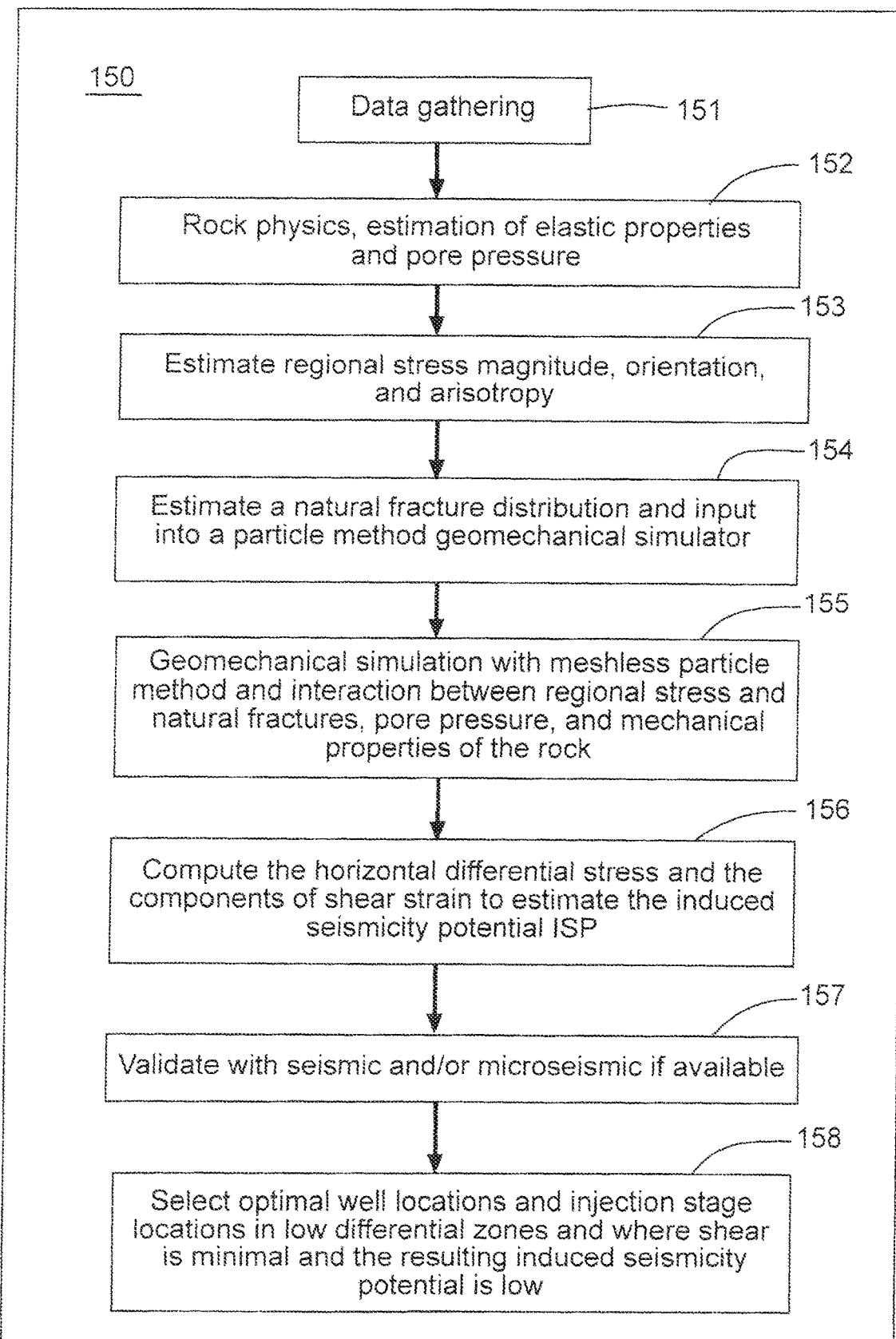
FIG. 4 is a diagrammatic flowchart of a method for fluid injection for water disposal and hydraulic fracturing design and optimization based on the use of the induced seismicity proxy.

FIG. 4 is a flow chart of an exemplary method 150 of induced seismicity potential prediction according to the present invention. In this regard, the method 150 will be described with respect to various steps. Generally, the present invention aims to predict the mechanical drivers of induced seismicity potential prior to drilling of new wells through the use of a new geomechanical simulation and data typically available during regional studies and field development (seismic, well data). The process involves multiple steps including data gathering, rock physics and estimation of elastic properties and pore pressure, regional stress estimation, natural fracture modeling, geomechanical simulation of regional stress interacting with natural fractures, computation of horizontal differential stress and strain components, validation with field data if available, selection of optimal well trajectories and positions for injection stages. The data used is comprised of information such as well locations, drilling, logging, completion, fracturing, seismic, microseismic, and production or injection data. A major advantage of the present invention is the ability to use a continuous fracture model to create an equivalent fracture model that will be used as input into a meshless particle-based geomechanical model to quickly simulate (i.e., in few hours) the interaction between the regional stress and the natural fractures represented by the equivalent fracture model. The resulting outputs of the present invention include the horizontal differential stress and shear strain components which can be used to optimize the position of the wellbores and injection points to produce the lowest potential for induced seismicity.

Figure 5:
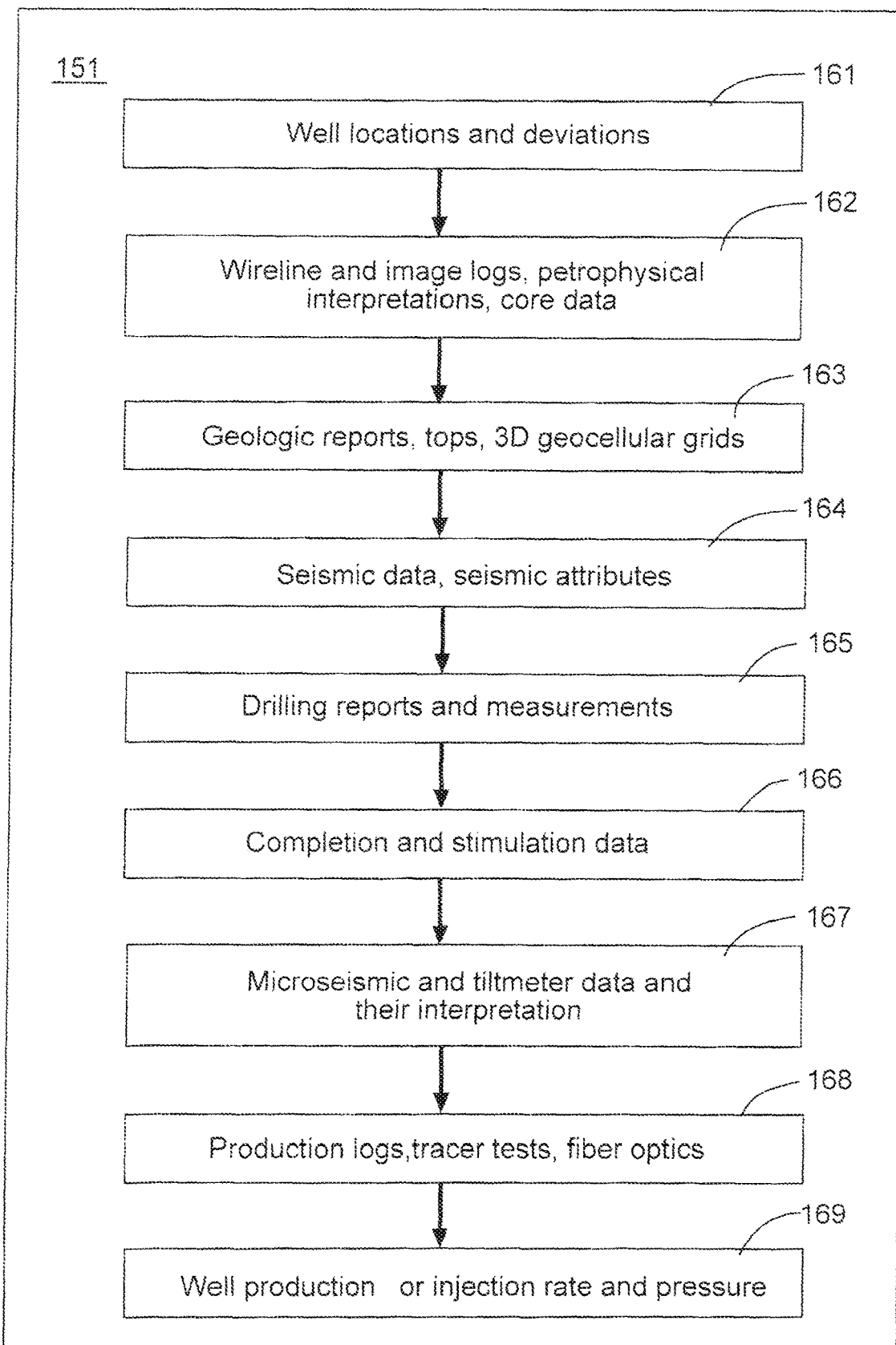
FIG. 5 is a diagram illustrating aspects of a data-gathering step 151 of the method illustrated in the flowchart of FIG. 4.

Referring now to FIG. 5, data gathering is an important part of the method 150 as many of the subsequent steps and analysis depend on the data gathered in step 151. To this end, data can be extracted from a variety of available sources. Examples of the various types of data that are commonly utilized will be described, however, no limitation is intended thereby. Rather, it is understood that the present invention can utilize essentially any type of information related to region, a field/reservoir or wells that can be quantified in some manner. Accordingly, one of ordinary skill in the art will recognize that extension of the present invention to types of data not explicitly described within the present disclosure is still within the scope of the present invention. Further, it is understood that the data may come in various types of file formats, including imported data from proprietary databases found in commercial software, open databases, spread sheets, .pdf files, text files, ASCII files (e.g., LAS files designed for well logs), xml files, SEGY files (e.g., special ASCII files designed for seismic data) or combinations thereof. In this regard, it is also understood that the file formats include both common file formats and proprietary file formats. Generally, data obtained from any type of format may be utilized within the methods and systems of the present disclosure. Those of ordinary skill in the art will recognize that some file conversion or other processes are implemented in some instances to allow for the proper processing of the data from the various file formats within the context of the present disclosure. Accordingly, the details of such conversions and processing will not be described in detail herein.

In some instances, the data gathering step 151 includes gathering or obtaining well locations and deviations 161, and reservoir properties 162 estimated from wireline logs such as gamma ray, density, resistivity, neutron, compressional and shear sonic, and image logs such as FMI, FMS, petrophysical interpretations leading to the estimation of porosity, water saturation, and core data providing measurement of total organic carbon (TOC), porosity, permeability, and fracture density. In some instances the data gathering includes geologic reports, geologic formations tops and 3D geocellular grids 163 that will allow the identification of the boundaries of the geologic formations 103 and 104 in the wellbores. The 3D grids could be imported from existing reservoir modeling software or constructed using the geologic formations tops available in the existing wells, wireline logs, and seismic data and its interpretation if available.

In some instances, the data gathering step 151 includes gathering or obtaining seismic data and seismic attributes 164. The seismic data could be post-stack or pre-stack, and the seismic attributes could be derived from a multitude of post-stack and pre-stack processes that include seismic resolution enhancement or bandwidth extension methods that allow the seismic signal to reach higher frequencies, seismic structural attributes such as coherency, similarity, volumetric curvature or any other seismic method that uses these seismic attributes to image faults and fractures, spectral decomposition methods that provide frequency dependent seismic attributes or any seismic attribute that combines multiple spectral attributes, post-stack seismic inversion methods such as colored inversion, deterministic inversion, sparse spike inversion, generalized linear inversion, stochastic or geostatistical inversion, pre-stack seismic inversion methods such as Extended Elastic Inversion, Facies Constrained Extended Elastic Inversion, simultaneous pre-stack inversion, AVO methods, azimuthal anisotropy methods, shear wave velocity anisotropy methods, isotropic and anisotropic velocity models and all other seismic methods that use seismic data to provide information over a large reservoir volume that includes one or multiple wells.

In some instances, the data gathering step 151 includes gathering or obtaining drilling reports and measurements 165, such as rate of penetration, mud losses and information derived from mud logs such as total gas, gas chromatography measurements. Adequately processed surface drilling data, mud losses and gas chromatography measurements are commonly available data and could be utilized as a proxy of fracture density when there are no wireline, image logs and core data 162.

In some instances, the data gathering step 151 includes gathering or obtaining completion stimulation data 166. The completion data includes the position and depth of the perforation clusters, cluster per fracture stages, tubing size, completion time. The stimulation data includes treatment volumes and rates, completion stages, initial and final instantaneous shut-in pressure (ISIP), breakdown pressure, closure pressure, conductivity, fracture gradient or other information regarding stimulation.

In some instances, the data gathering step 151 includes gathering or obtaining earthquake events, microseismic or tiltmeter data and their interpretation 167, which could provide some indication on the geometry of the hydraulic fracture, direction of localized maximum horizontal stress, and in some instances information on the failure mechanisms and the orientation of the critically stressed natural fractures. In the proposed workflow to estimate initial geomechanical conditions 150, it is desirable to validate the predicted results by using interpreted and correctly positioned earthquakes, microseismic or tiltmeter data and events 167.

In some instances, the data gathering step 151 includes gathering or obtaining hydraulic fracture stage performance indicators such as production logs, tracer tests, fiber optics 168, which provides quantitative or qualitative information on the performance of each hydraulic fracture stage. In the proposed workflow to estimate initial geomechanical conditions 150, it is desirable to validate the predicted results by using one or multiple data that could be considered a fracture stage performance or mechanical indicator 168.

The workflow 150 provides the geomechanical sweet spots which represents the initial geomechanical conditions that could be used to optimize the position of wellbores used for water disposal and hydraulic fracturing in a way that will reduce the risk of creating earthquakes resulting from the perturbation of the stress field caused by the injection of high volumes of fluids in the subterranean fractured formations.

In some instances, as part of the data gathering step 151, the collected data is processed to fit the needs of the subsequent steps of the method 150. For example, many data types require quality control steps to remove noise and outliers that could introduce errors in the subsequent modeling steps of the method 150. Other data, such as water injection and measured reservoir pressure, are used to estimate through interpolation or fluid flow simulators the distribution of the pore pressure needed as input in the geomechanical simulator. The outcome of the data gathering process 151 and the quality control applied to a data set that will include one or multiple wells that will have varying data collected during and after drilling, completion and stimulation as well as in some instances volumetric information represented by seismic, microseismic or tiltmeter data that provide information over a large area around one or multiple wells.

Returning to FIG. 4, with the data gathered at step 151, the method 150 continues at step 152 with rock physics and estimation of elastic properties and pore pressure. In this step, the objective is to estimate the static elastic properties needed for the geomechanical modeling which include the Poisson's Ratio, Young's Modulus and density. In some instances the wireline and image logs, petrophysics interpretation, core data 162 is not available at all or is available only in a limited number of wells. When no existing well is available or the wireline logs and core data is not available in any existing well, step 152 can use surface drilling data adequately processed or published data or wireline log data from analogue fields or nearby wells until log data becomes available in the field 110. If the compression, shear sonic and density logs are available in wells 101 and 102, the dynamic elastic properties such as Young's Modulus and Poisson's Ratio are computed using established geophysical relationships. If static measurements of the elastic properties made in laboratory tests conducted on reservoir rocks are available, the dynamic elastic properties derived from the geophysical logs could be calibrated to the static measurements and used in the next steps of method 150. If the laboratory static measurements of the elastic properties are not available, then surface drilling data adequately processed to provide static elastic properties or published correlations or nearby well data could be used to estimate the adjustment factor needed to multiply the dynamic elastic properties.

The elastic properties and pore pressure derived at the wells 101 and 102 need to be propagated in the entire subterranean formation 104 and 103. This could be accomplished by using well data alone, or combining the available well data with seismic data, if available. If no seismic data is available, the elastic properties available in the wells 101, 102 and other possible wells in the field 110, could be distributed in the subterranean formations using deterministic, geostatistical, neural networks, or any other reservoir modeling method. When seismic data is available, it could be used to derive the distribution of the elastic properties in multiple ways. When pre-stack seismic is available, it can be used in pre-stack elastic inversion to derive directly the seismically derived compressional and shear velocity along with an estimate of the density which are then combined to form the seismically derived dynamic elastic properties. These dynamic elastic properties are adjusted to static measurements using the same procedure described for the adjustments applied to the elastic properties derived from well logs. If pre-stack seismic is not available, post stack seismic attributes could be used to guide the geostatistical or neural network based interpolation in the subterranean formation 104 and 103 of the elastic properties and pore pressure derived at wells 101, 102 and other possible wells in the field 110.

Referring again to FIG. 4, with the data gathered at step 151, the elastic properties and pore pressure estimated in the entire subterranean formations 104 and 103, the method 150 continues at step 153 with the estimation of the regional stresses. In this step, the objective is to estimate the vertical stress, and the magnitude and orientation of the regional horizontal stresses in field 101. This estimation depends on the available data in the field 101 or in nearby fields. For example, the different methods that can be used to compute these stresses and the data needed for each method are described in detail in the book by Mark Zoback entitled "Reservoir Geomechanics", from Cambridge University Press (2010). A variety of conventional techniques for estimating these stresses and data are known in the industry.

Figure 6A:
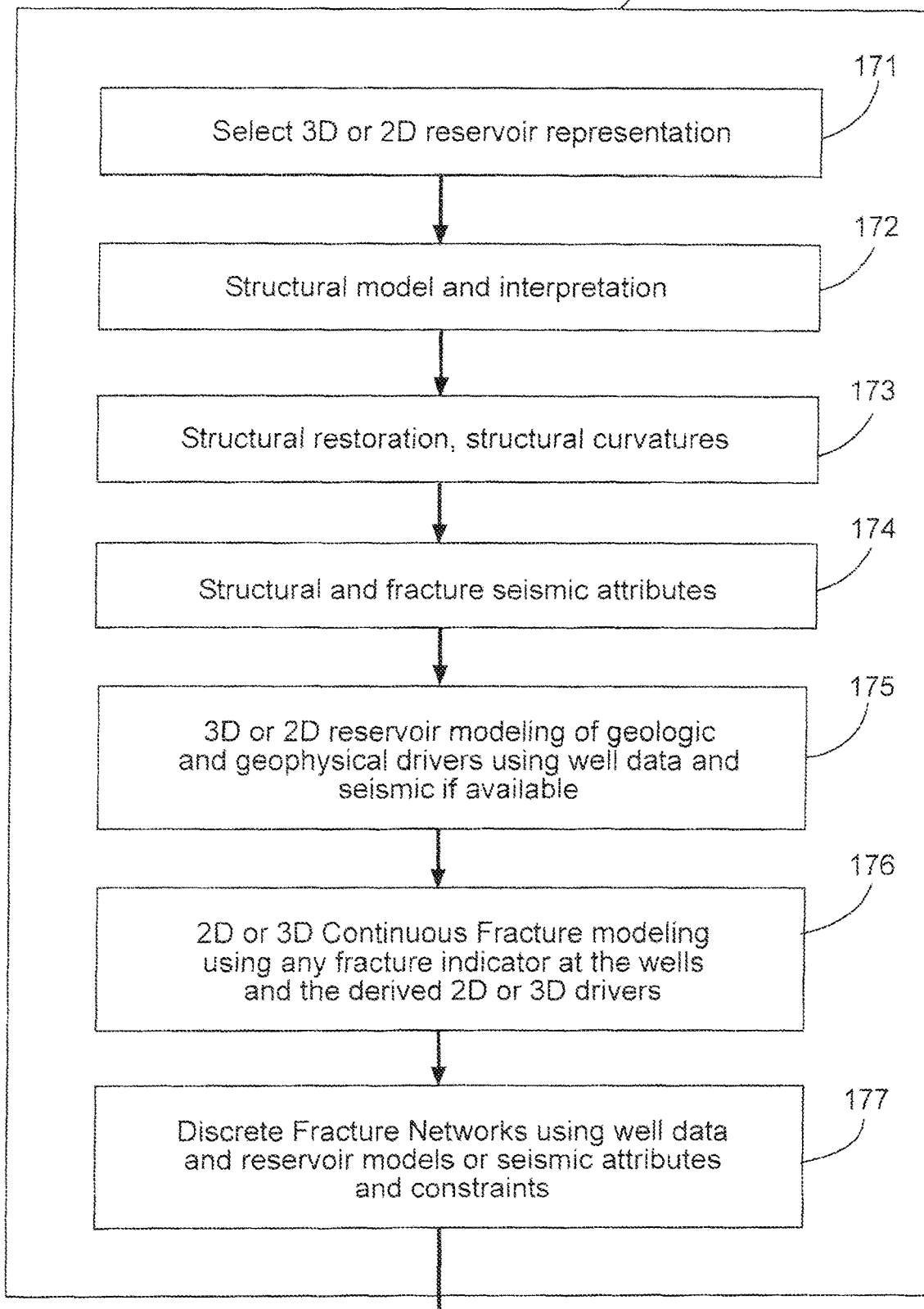
FIGS. 6a and 6b are a diagram illustrating aspects of the estimation of a natural fracture model step 154 of the method illustrated in the flow chart of FIG. 4.
Figure 6B:
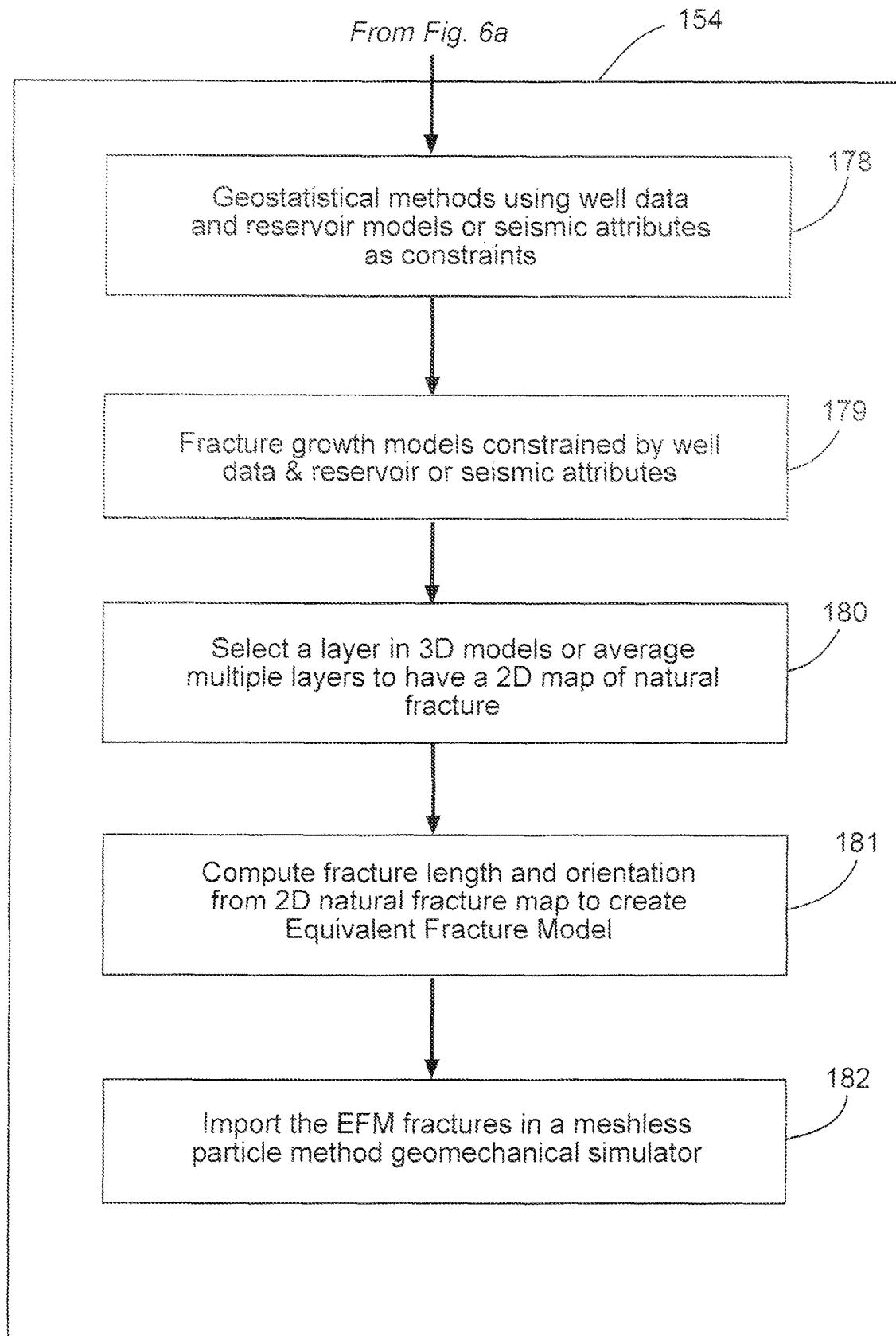

Referring again to FIG. 4, the method 150 continues at step 154 with the estimation of the natural fracture distribution shown in detail in FIGS. 6a and 6b. Since the natural fracture distribution is a key component of the invention, multiple methods are used to determine the best natural fracture distribution possible given a set of available data. The process for finding the natural fractures, for example, in the naturally fractured subterranean formation 103, starts by selecting a three dimensional or two dimensional representation 171 of the considered reservoir volume. When using a three dimensional representation, the natural fractures could be represented by discrete planes or by an average characteristic of the natural fractures, such as fracture density, in a representative elementary volume. When using a two dimensional representation of the reservoir volume, the natural fracture density is approximated at a surface location 102 or 101 by an average value, such as hydrocarbon production rates, that could be used as a proxy for the combined effects of the complex three dimensional fracture network 109. When using either a three dimensional or two dimensional representation of the reservoir, the boundaries of the naturally fractured subterranean formation 103 can be represented by the structural model that includes the interpreted geologic boundaries derived by using seismic data 164 or geologic reports and well tops 163.

Multiple methods can be used in this invention to determine the natural fracture distribution. The methods involve the use of one or multiple types of data and could require one or multiple processing steps. Among the methods that require minimal data and processes, the tectonics methods use the structural surfaces and their deformation to infer a fracture density that is assumed to be high where the structural geologic surface is highly deformed. The degree of deformation of the geologic surface is measured by computing the curvature on the current geologic structural surface or by the amount of strain generated while deforming a flat surface until it takes the shape of the current geologic structural surface. These methods through structural restoration and structural curvatures 173 could provide a distribution of the natural fractures in certain tectonics regimes but they are approximations that in some situations do not provide a realistic distribution of the natural fractures Another method that provide fracture proxies in certain particular situations is the use of certain seismic algorithms applied to seismic data 164 to provide structural or fracture seismic attributes 174. The structural seismic processing methods use the dip in the seismic data to compute the curvature, or compare the presence or absence of correlation between multiple nearby seismic traces. All the structural seismic attributes and the methods used to derive them from seismic data are described in great detail in the book by Chopra S. and K. Marfurt, entitled "Seismic Attributes For Prospect Identification and Reservoir Characterization," published by the Society of Exploration Geophysicists and European Association of Geoscientists and Engineers (2007). Examples of seismic processing algorithms that attempt to image directly the natural fractures are described in great detail in the book by Liu, E. and Martinez, A., entitled "Seismic Fracture Characterization", published by EAGE Publications by (2013). When fracture information from well data is not available or not sufficient and only seismic data is available, the present invention can use the structural seismic attributes as a proxy for the distribution of the natural fractures.

One method that is able to derive a 2D or 3D distribution of the natural fractures relies on the use of geologic and geophysical drivers which represent reservoir properties that are known to impact the degree of natural fracturing. For example, brittle reservoirs tend to have more fractures than ductile rocks that could deform without breaking and creating fractures. In addition to brittleness of the rock, the thickness of the fractured subterranean formation 103 is another well recognized fracture driver whereas thinner parts will have more natural fractures than thicker parts. In this context, the estimation of the natural fractures as a continuous property derived in the entire 2D or 3D study area requires the estimation of the geologic and geophysical drivers that could be computed directly from seismic data 164 or estimated in 2D or 3D by combining the available well logs and core data 162 with the available seismic data and derived seismic attributes 164. This estimation of the continuous fracture drivers in the entire 2D or 3D study area can be achieved by using the existing deterministic interpolation methods, geostatistical methods, neural networks or any other reservoir modeling method able to propagate the limited well data in the entire 2D or 3D study area.

Once the geologic and geophysical drivers are available over the 2D or 3D study area, the natural fracture density available at the wells and measured from wireline and image logs, petrophysical interpretations and core data 162, from drilling reports 165, or from well production 169 can be propagated to create a continuous natural fracture density defined in the entire 2D or 3D study area by using artificial intelligence tools such as neural network in the methodology described by Ouenes, A., "Practical Application of Fuzzy Logic and Neural Networks to Fractured Reservoir Characterization," Computer and Geosciences, 26, 953-962 (2000). This artificial intelligence workflow will find the geologic relationship that relates the continuous drivers available in the entire study area with the natural fracture defined in a 3D representation along the wellbores 105, 106 or in a 2D representation at the well locations such as 101 and 102. Once this geologic relationship is found and validated with existing well data, it will be applied over the entire study area to predict the continuous natural fracture density or its proxy defined using wireline logs 162, drilling reports measurements such as mud losses 165, or well performance derived from well production 169.

Referring again to FIG. 6, the method 154 continues at step 177 where the natural fracture could be represented by discrete fracture planes and estimated using a statistical method that uses the available fracture statistics available at the wells. The discrete fracture network will attempt to honor the fracture statistics available at the wells as well as a continuous natural fracture property such as the one derived in step 176 or a seismic structural attribute 174 to guide the distribution of the discrete fracture network as described in Ouenes, A., and Hartley, L. J., "Integrated Fractured Reservoir Modeling Using Both Discrete and Continuum Approaches," Society of Petroleum Engineers. doi:10.2118/62939-MS (2000).

Referring to FIG. 6b, the method 154 continues at step 178 where the natural fracture model could be distributed in the 2D or 3D study area using geostatistical methods that rely mainly on the natural fracture statistical information derived at the wells as illustrated by J.-P. Chiles, "Fractal and Geostatistical Methods For Modeling Of A Fracture Network," Mathematical Geology, 20(6):631-654 (1988). The geostatistical methods used to distribute the natural fractures could be constrained by additional information such as seismic data 164 as illustrated by Liu, X., Srinivasan, S., and Wong, D., "Geological Characterization Of Naturally Fractured Reservoirs Using Multiple Point Geostatistics," Society of Petroleum Engineers. doi:10.2118/75246-MS (2002).

Referring again to FIG. 6b, the method 154 continues at step 179 where the natural fracture model could be derived with growth model as shown by Olson, J. E, "Joint Pattern Development: Effects Of Subcritical Crack Growth And Mechanical Crack Interaction," Journal of Geophysical Research, 1993, Volume 98, Issue B7, p. 12251-12265. These growth models could also be combined with geostatistical methods and discrete fracture networks as illustrated by Bonneau, F., Henrion, V., Caumon, G., Renard, P., Sausse, J., "A Methodology For Pseudo-Genetic Stochastic Modeling Of Discrete Fracture Networks," Computers & Geosciences, 2013, 56, 12.

Referring again to FIG. 6b, the method 154 continues at step 180 where the 3D natural fracture model defined in a continuous way in 176 or approximated with a structural seismic attribute 174, or estimated from structural restoration resulting strain or a structural curvature 173 needs to be extracted along a structural horizon close enough to the wellbore 108, or averaged in an interval encompassing the wellbore 108 and inside the subterranean formation 103. The resulting averaging process or selection along a structural horizon will lead to the availability of a 2D map of natural fracture density or one of its proxies.

Figure 7:
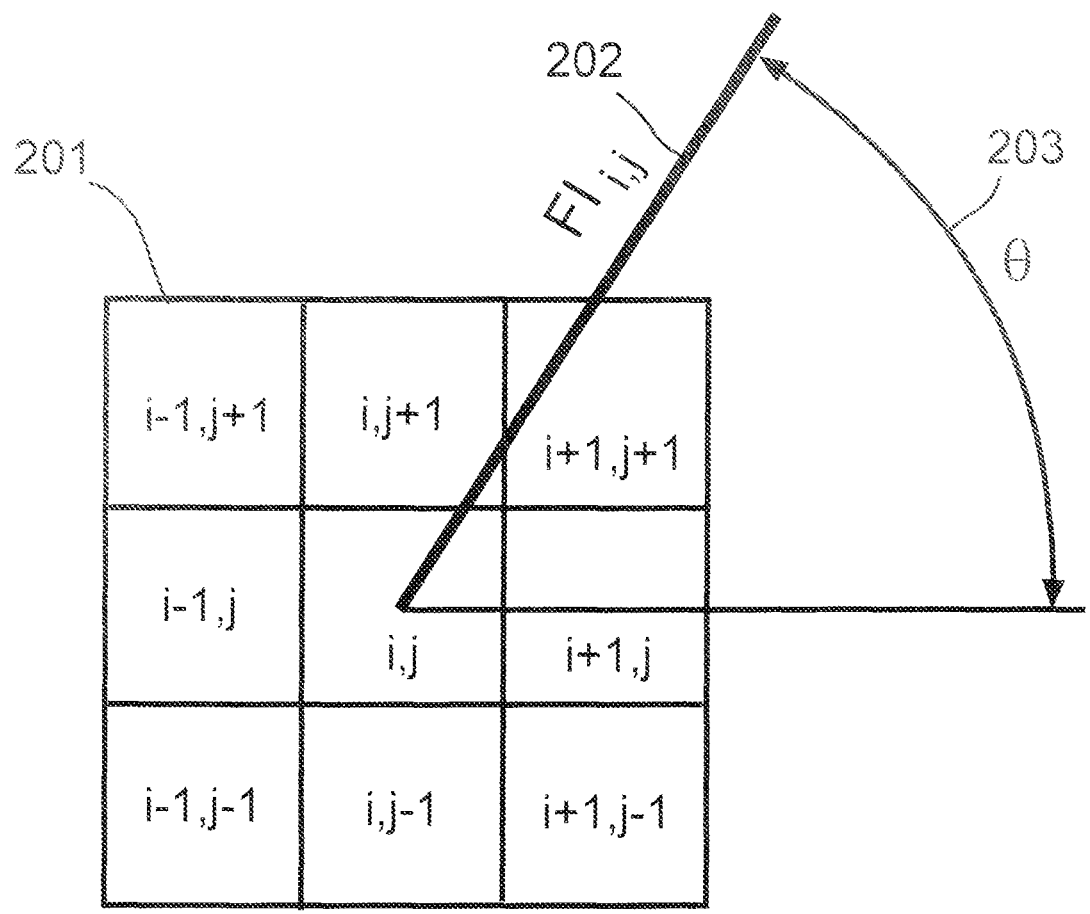
FIG. 7 is a diagram showing a template of nine values used to compute the length and orientation of natural fractures from a 2D scalar map.

Referring again to FIG. 6b, the method 154 continues at step 181 where the continuous scalar 2D map natural fracture model derived in 180 is converted to an equivalent fracture model representing a vectorial map where at each location on the map will have a fracture length and fracture orientation computed using either the weighting method described by Zellou, A. M., Ouenes, A., and Banik, A. K., "Improved Fractured Reservoir Characterization Using Neural Networks," Geomechanics and 3-D Seismic., Society of Petroleum Engineers. doi:10.2118/30722-MS (1995, Jan. 1) or any other method described by Fisher N., I., "Statistical Analysis Of Circular Data," Cambridge University Press (1996). This step 181 is one of the fundamental elements of the present invention, wherein any 2D map scalar representation of the distribution of the natural fractures density or any proxy that could represent natural fracture density is converted to a set of fracture segments that have a certain length and orientation. Given the importance of this step in the present disclosure, the details of this step is illustrated by using the weighting method, but any other circular statistical method could be used to achieve the same goal of transforming a scaler 2D map of fracture density into an equivalent fracture model made of fracture segments characterized by a length and an orientation. Referring to FIG. 7, the weighting method 200 is illustrated by considering a subset of a 2D grid centered on the cell (i,j) and divided into discrete cells labeled by their coordinates I and J 201, where the fracture density at cell (i,j) is labeled FD (i,j) is represented by a segment which has a length L(i,j) 202 and an angle theta (i,j) 203. The length L(i,j) could be given by a formula such as:

$$L(i,j)=1.5\text{pow}[10\times(FD(i,j)/\max FD(i,j))]$$

Where max FD(i,j) represents the maximum value of the fracture density in the entire 2D grid. The angle theta (i,j) of the equivalent fracture is given by a formula such as:

$$\text{Theta}(i,j)=\text{Arcsin}\{F(i,j)/\text{sqrt}[F(i,j)*F(i,j)+E(i,j)*E(i,j)]\}$$

Where $E(i,j)=A(i,j)*0.707+B(i,j)$ and $F(i,j)=C(i,j)*0.707+D(i,j)$ Where:

$$A(i,j)=FD(i+1,j+1)-FD(i-1,j-1)+FD(i+1,j-1)-FD(i-1,j+1)$$

$$B(i,j)=FD(i+1,j)-FD(i-1,j)$$

$$C(i,j)=FD(i+1,j+1)-FD(i-1,j-1)+FD(i-1,j+1)-FD(i+1,j-1)$$

$$D(i,j)=FD(i,j+1)-FD(i,j-1)$$

Referring again to FIG. 6b, the method 154 continues at step 181 where the 3D natural fracture model If a discrete fracture network 177 or fracture growth model 179 was used to generate the natural fracture distribution in 3D, the 2D natural map is found by taking the intersection between the structural horizon close to the wellbore 108 with the 3D discrete natural fracture model. The resulting intersection provide the equivalent fracture model needed for the next step 182 where the natural fracture information is input in a meshless particle based method geomechanical simulator.

Referring again to FIG. 6b, the method 154 continues at step 182 where the equivalent fracture model is used to convert the natural fracture segments derived in the equivalent fracture model into particles that will be used in a meshless particle based method such as the material point method or any similar particle method. The explicit discretization of a segment representing a natural fracture into particles is illustrated by Nairn, J. A., "Material Point Method Calculations with Explicit Cracks," Computer Modeling in Engineering & Science, 4, 649-66, 2003. Since the use of a meshless particle based geomechanical simulator and its ability to use as input the derived equivalent fracture is a key element of the present invention, more details are given on a particular particle based method called Material Point Method (MPM) and the publicly-available software that can be used to implement the invention.

Figure 8:
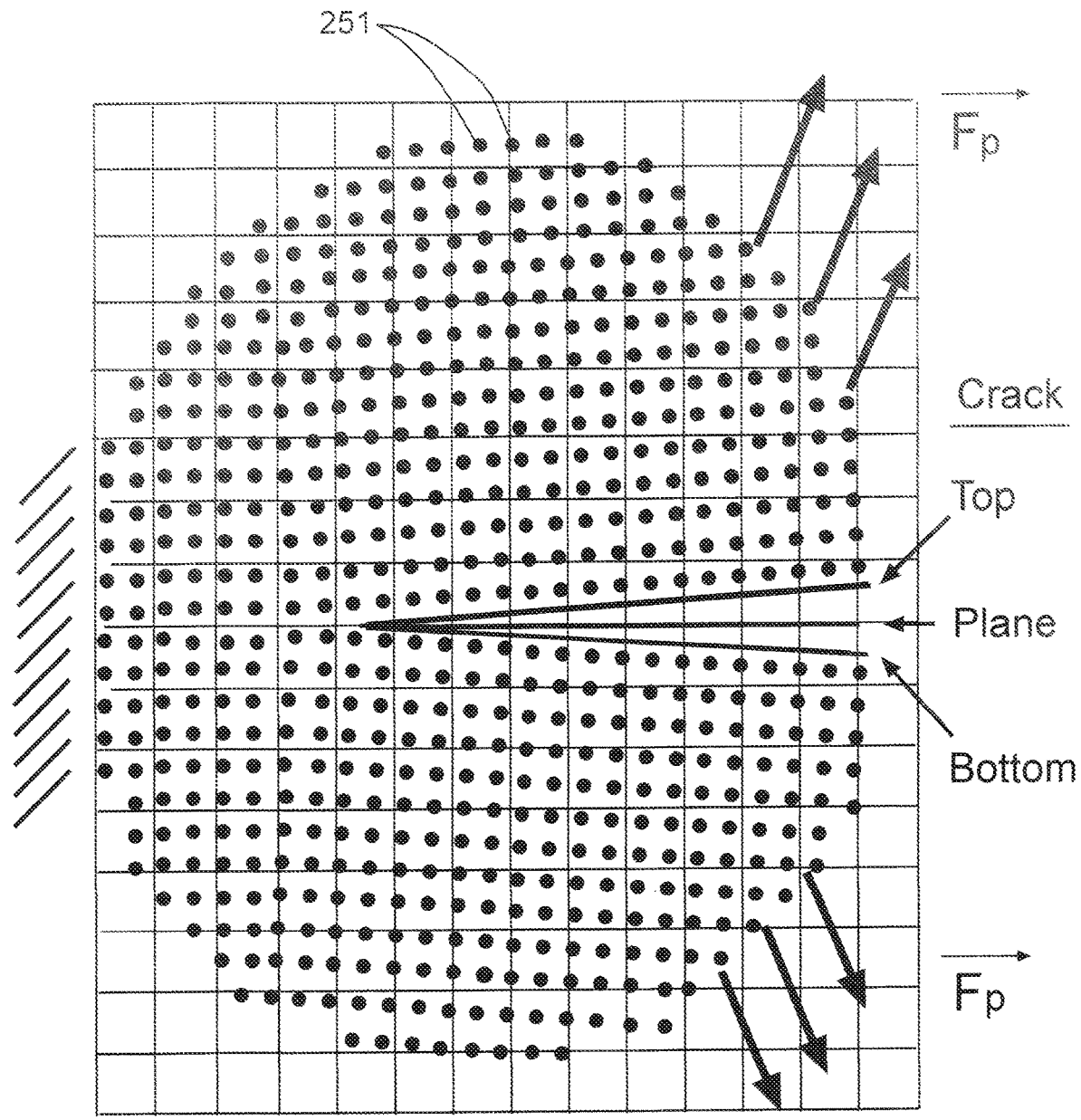
FIG. 8 is a diagram showing an explicit representation of a natural fracture in the material point method.

The Material Point Method (MPM) is a meshless method developed by Sulsky, D., Z. Chen, and H. L. Schreyer, "A Particle Method For History-Dependent Materials," Computer Methods in Applied Mechanics and Engineering, 118, 179-196 (1994), as a potential tool for numerical modeling of dynamic solid mechanics problems. It represents an alternate approach, with alternate characteristics, for solving problems traditionally studied by dynamic finite element methods. In MPM, a material body is discretized into a collection of points 251, called particles as shown in FIG. 8. A background grid is associated with the particles; it is composed of cells. Solid body boundary conditions are applied to the grid or on the particles. The background grid is only used as a calculation tool space for solving the equations of motion. At each time step, the particle information is extrapolated to the background grid, to solve these equations. Once the equations are solved, the grid-based solution is used to update all particle properties such as position, velocity, acceleration, stress and strain, state variables, etc. This combination of Lagrangian (particles) and Eulerian (grid) methods has proven useful for solving solid mechanics problems. It has been shown to be especially useful for solving problems with large strains or rotations and involving materials with history-dependent properties such as plasticity or viscoelasticity effects.

One potential application of MPM is dynamic fracture modeling as shown by Nairn, J. A., "Material Point Method Calculations with Explicit Cracks". Computer Modeling in Engineering & Science, 4, 649-66, 2003. To handle explicit fractures such as the ones developed with the equivalent fracture model, MPM was extended by Nairn using the CRAMP (CRAcks in the Material Point) algorithm. Both the particle nature and the meshless nature of MPM makes CRAMP well suited to the analysis of problems in fractured media. In 2D MPM, fractures are represented by a series of line segments as computed in the equivalent fracture model. These line segments could represent a continuous long fault made of multiple continuous points or a discrete representation of that fault by multiple disconnected segments. The endpoints of the line segments are massless material points, called fracture particles. By translating the fracture particles along with the solution, it is possible to track fractures in deformed or translated bodies. The fracture particles also track crack-opening displacements that allow for calculation of fracture surface movements. The fracture particles influence the velocity fields on the nearby nodes in the background grid. In addition, CRAMP fully accounts for fracture surface contact, is able to model fractures with frictional contact, can use fractures to model imperfect interfaces, and can insert traction laws to model cohesive zones, or input pore pressure.

The CRAMP algorithm models displacement discontinuities in fractured media by allowing each node near the fracture to have two velocity fields representing particles above and below the fracture as shown in FIG. 8. The disclosure uses the publically available MPM software Nairn-MPM-FEA that can be downloaded from https://code.google.com/p/nairn-mpm-fea.

Although the particle method is the preferred technique to do the geomechanical simulation of the effect of the regional stress on the natural fractures, it should be understood that other techniques could be employed. Possible alternative geomechanical methods include finite elements, finite difference, or any discretization scheme suitable for solving continuum mechanics equations.

Figure 9:
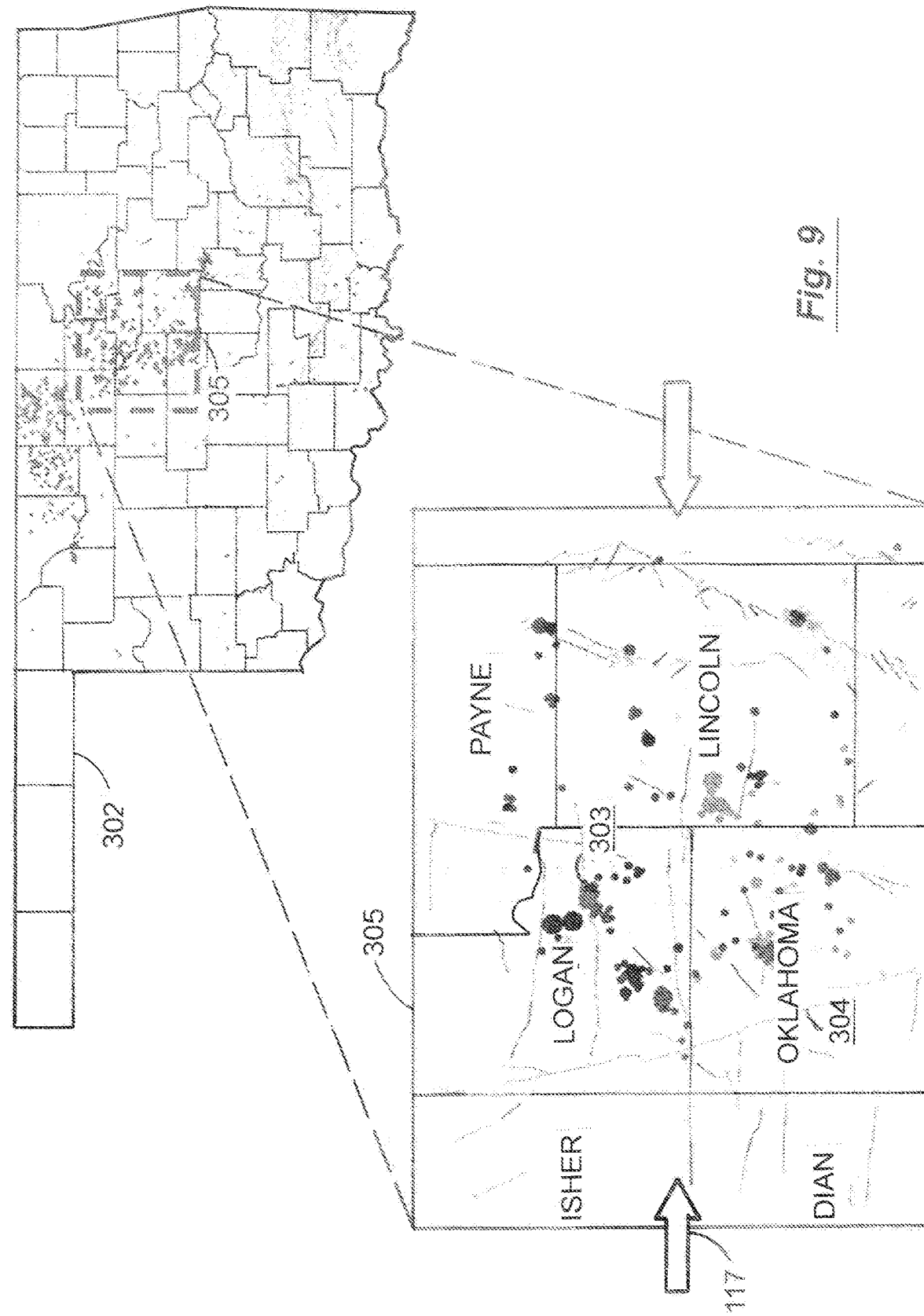
FIG. 9 is a diagram showing data used for a demonstrative study that includes regional fault data and earthquake data over the state of Oklahoma and a selected area of three counties near Oklahoma City with the regional stress applied on it.

To illustrate this workflow, the disclosed system is described using information from an actual public dataset from the Oklahoma and United States Geological Surveys. Referring to FIG. 9, a dataset is considered in the state of Oklahoma 302, comprised of fault data 304 to be used in generating an EFM 305, and earthquake epicenter and magnitude data 303, to be withheld from the model and used for validation 157.

Figure 10:
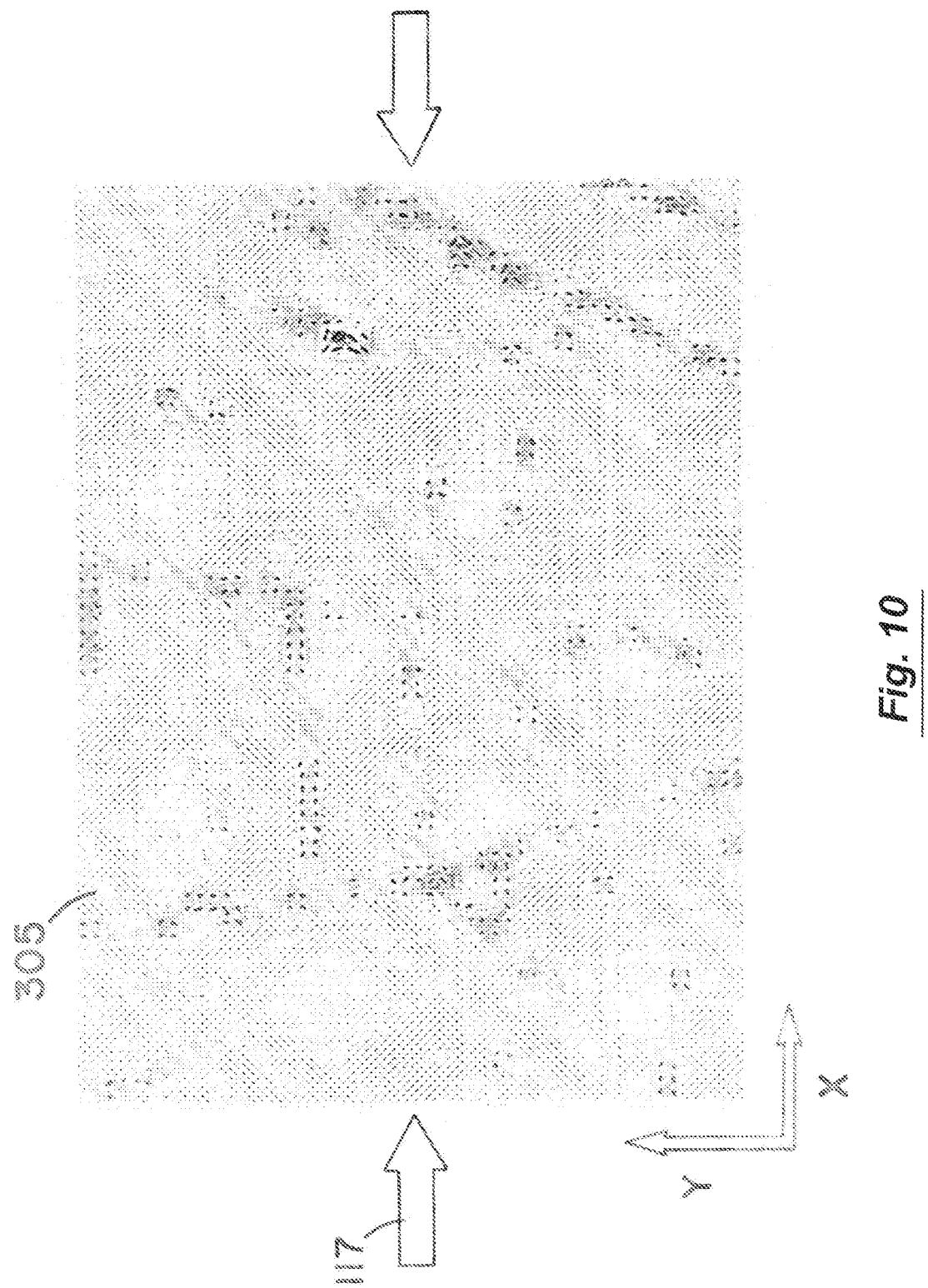
FIG. 10 is a diagram showing the Equivalent Fracture Model (EFM) derived from the regional faults of FIG. 9 to be used as input in the geomechanical model

Referring to FIG. 9, a smaller area 305 is considered for the illustration of the present disclosure. In FIG. 9, the natural fractures 304 are available as continuous lines. These continuous faults could be used as-is where each line is discretized into multiple continuous points or could be transformed into multiple discontinuous smaller segments. Either continuous or discontinuous representation of the fault by segments leads to an Equivalent Fracture Model (EFM) 306 as shown in FIG. 10. The EFM is input in the MPM geomechanical simulator along with the regional stress 117 and constant average elastic properties and pore pressure. If elastic properties and pore pressure were publically available at different locations, their variable distribution could also be input in the poroelastic geomechanical simulator.

Referring again to FIG. 4, with the natural fracture distribution completed and the resulting equivalent fracture model discretized into particles and input into a meshless particle based geomechanical simulator, the method 150 continues at step 155 where the interaction between the derived regional stress 117 and the natural fracture distribution transformed into an EFM 306 will be simulated. The particle based geomechanical simulator uses the 2D plane strain theory to solve numerically the momentum equation in the presence of the regional stress 117 representing the main boundary condition. The regional stress boundary conditions 117 are applied to the study area 305 by simulating the compression over a time period that is sufficient to achieve quasi-equilibrium. An example of particle based geomechanical simulator is described by Aimene, Y. E., and Nairn, J. A., "Modeling Multiple Hydraulic Fractures Interacting with Natural Fractures Using the Material Point Method," Society of Petroleum Engineers. doi:10.2118/167801-MS (2014, Feb. 25).

Referring to FIG. 4, the geomechanical results considered specifically here are stress and strain results derived at quasi-equilibrium for each particle in the meshless particle-based geomechanical simulation. The method 150 continues at step 156 to compute the horizontal differential stress ($S_{Hmax}-S_{Hmin}$) and the shear strain components (du/dy and dv/dx) that are used to compute a geomechanical proxy for induced seismicity potential, ISP, according to the formula:

$$ISP=(S_{Hmax}-S_{Hmin})*(-dv/dx-du/dy)$$

Figure 11:
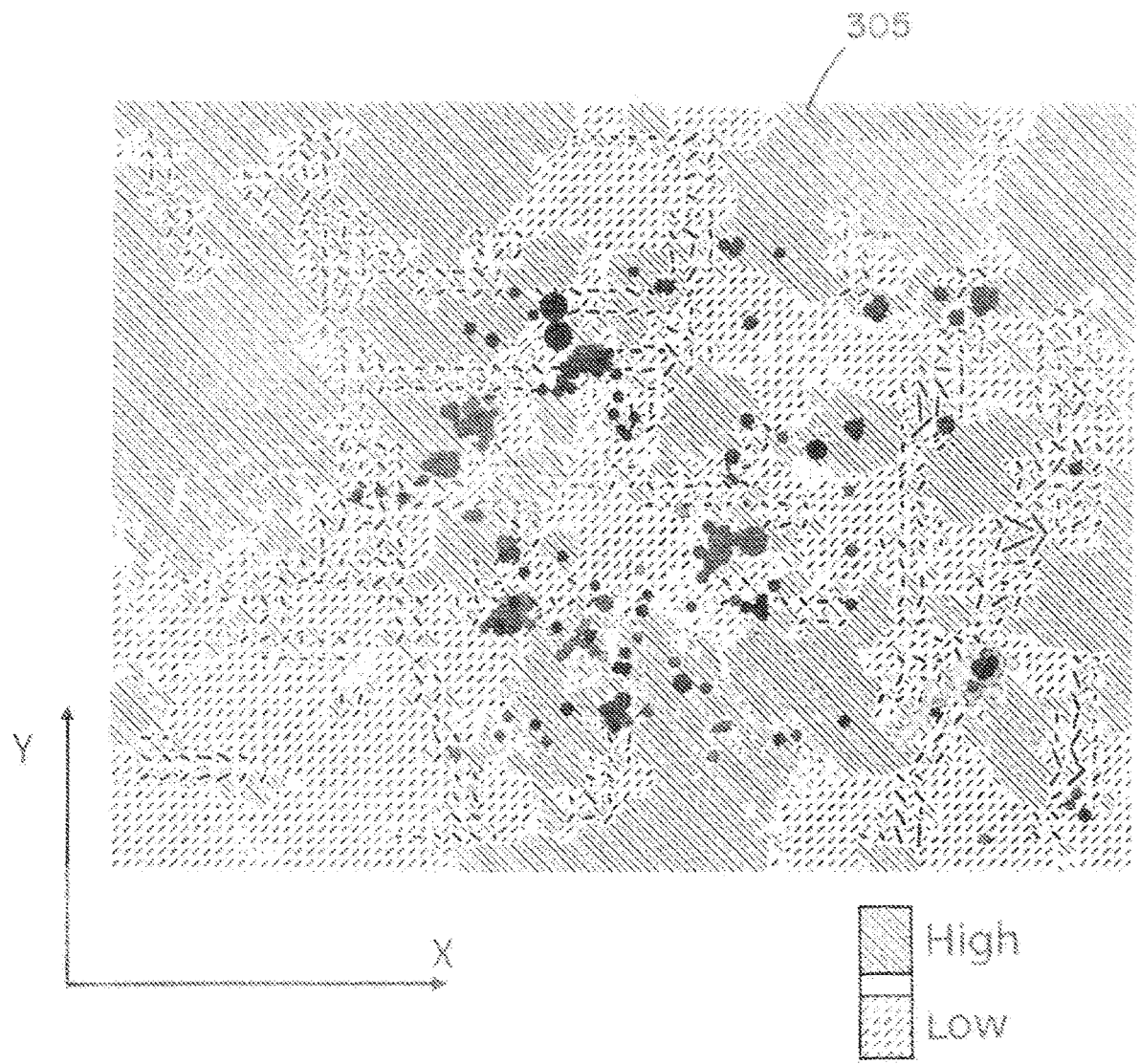
FIG. 11 is a diagram showing the geomechanical proxy for induced seismicity co-plotted with historical earthquake data for validation purposes.

The geomechanical simulator outputs the induced seismicity potential proxy 306 which represents a combination of differential stress ($S_{Hmax}-S_{Hmin}$) and shear components (du/dy and dv/dx) as shown in FIG. 11. Similar combinations of quantifications of stress anisotropy and strain from the geomechanical simulation may be substituted for these quantities. For the sake of brevity, however, the numerous iterations of these combinations will not be described separately. The resulting proxy map 306 shows areas colored in white discontinuous patterns where the proxy is low thus indicating areas which are less likely to generate seismicity in reaction to injection. To illustrate the control differential stress and shear strain have on seismicity, historical seismic events are co-plotted 303, and is considered for validation step 157 in the workflow 150 shown in FIG. 4.

Referring to FIG. 4, the geomechanical proxy for induced seismicity 306 is validated in step 157 if earthquake, microseismic or completion stage performance indicators are available. The next step is to use these results in applications 158 mostly related to the selection of well sites in low induced seismicity potential. Examples of how the results are applied in the context of the present disclosure, are considered. However, no limitation is intended thereby. Rather, it is understood that the methodology of the present invention can apply the derived results to a wide array of uses for wells drilled and completed, wells drilled but not completed, and undrilled wells. Accordingly, one of ordinary skill in the art will recognize that extension of the present methodology to other uses of the induced seismicity proxy not explicitly described within the present disclosure is within the scope of the present invention.

The induced seismicity potential proxy 306, available in one or multiple subterranean formations 104 or 103, can be used to address many issues surrounding underground injection well site selection and operation. For example when selecting the position of the drilling pads where wellbores 101, 102, 105, 106, 107, 108 will be placed, we first define the induced seismicity potential that is acceptable for injection. The normal prevailing potential without the presence of natural fractures is uniform. We consider that a low induced seismicity potential could be achieved when the presence of the natural fractures creates a potential range of values below the background uniform value.

Once a well or pad area has been selected, the results could also be used for the optimal injection zone by comparing the area of low induced seismicity potential 306 in each subterranean formation 104 and 103. The subterranean formation with the largest area of low induced seismicity potential 306 could yield lower seismic response. For illustration purposes we assume that applying this criteria leads to the formation 104 being the optimal one with the largest area with low differential stress as compared to 103.

Figure 12:
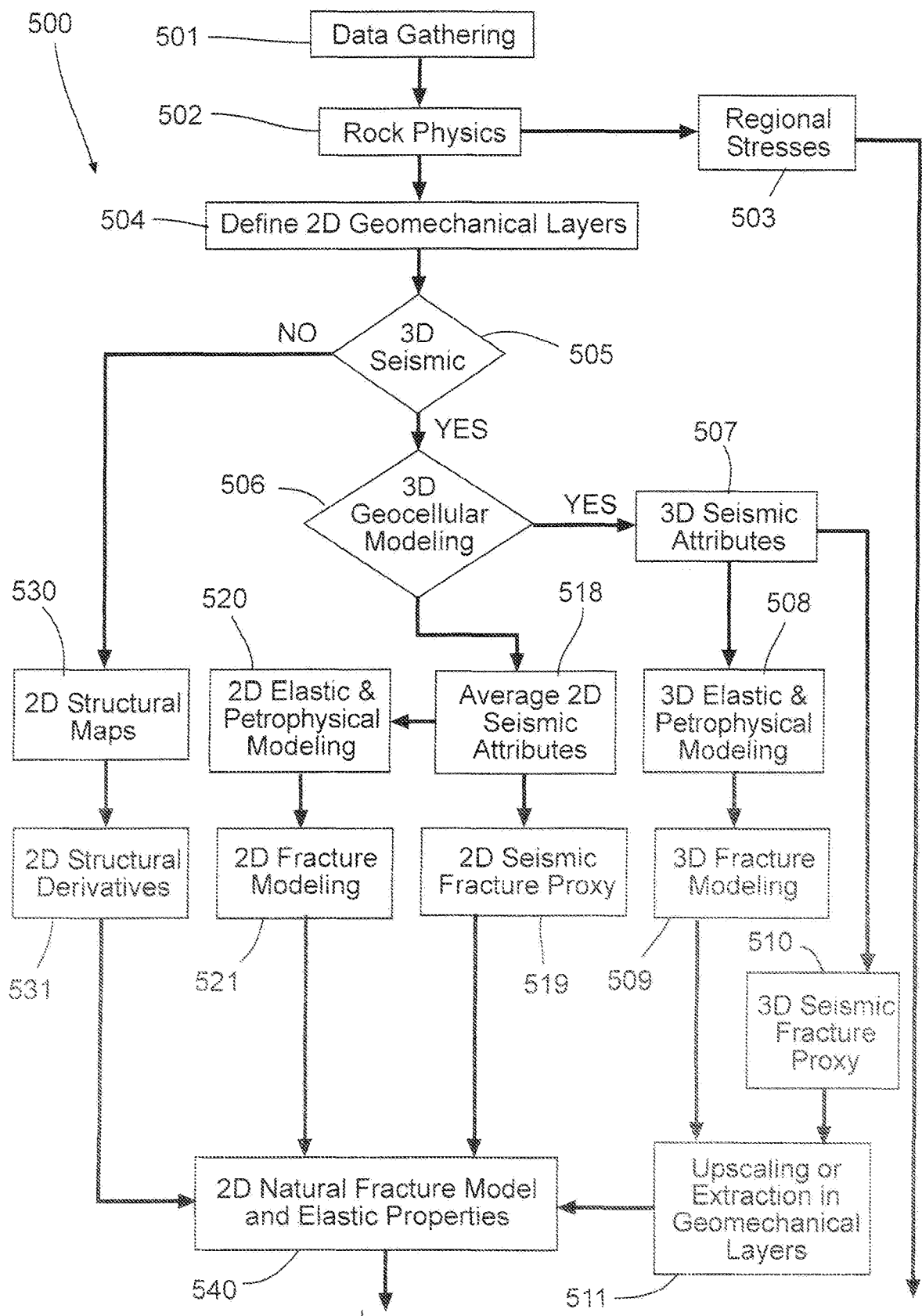
FIGS. 12 and 13 a diagrammatic flow chart of a method for induced seismicity potential prediction based on the geomechanical proxy.
Figure 13:
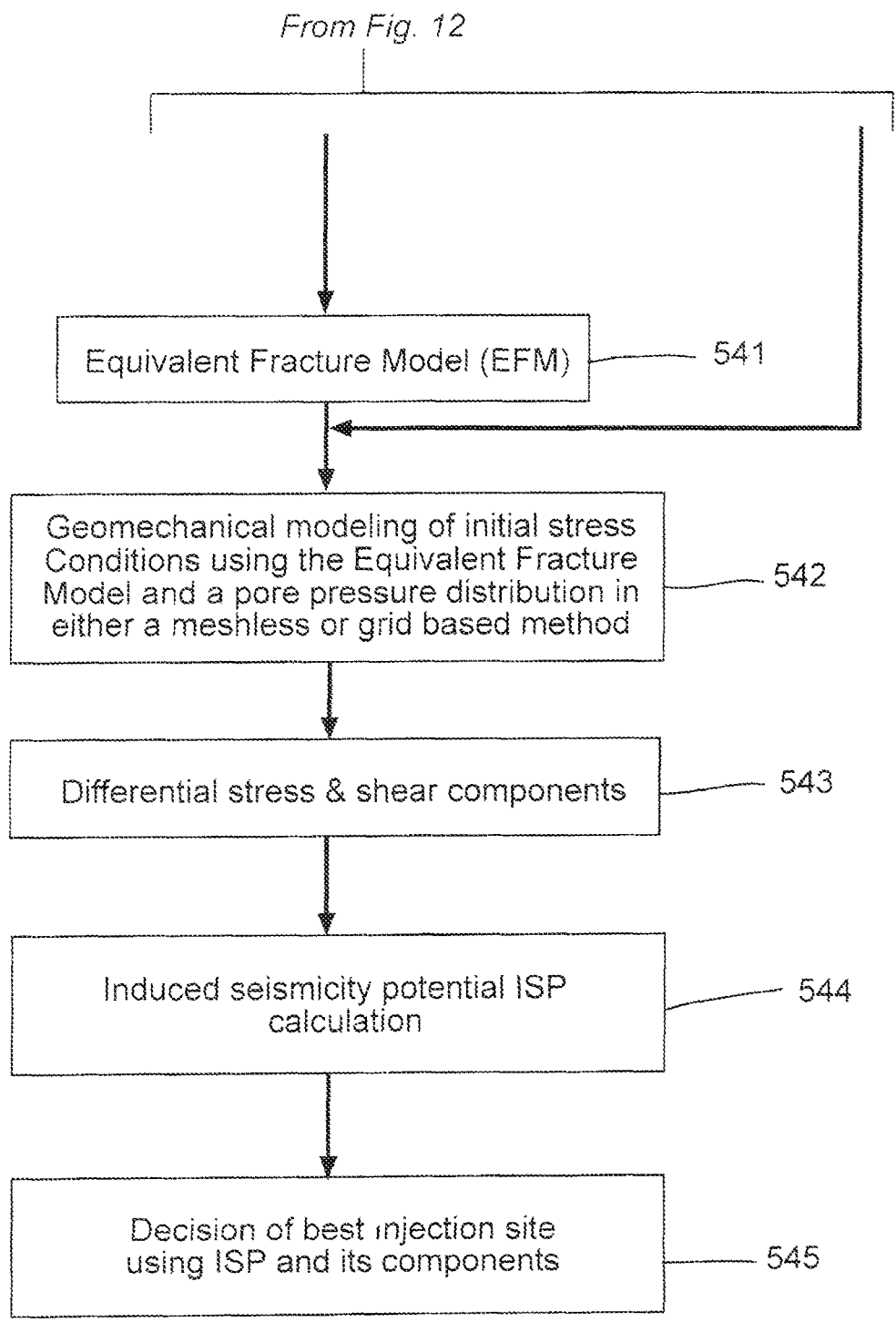

FIGS. 12 and 13 are a flow chart of an example process 500 for reducing seismic hazard associated with injection practices in naturally subterranean fractured reservoirs. Some or all of the operations in the process 500 can be implemented by one or more computing devices. In some implementations, the process 500 may include additional, fewer or different operations performed in the same or different order. Moreover, one or more of the individual operations or subsets of the operations in the process 500 can be performed in isolation or in different contexts to perform one or more of the disclosed techniques. Output data generated by the process 500, including output generated by intermediate operations, can include stored, displayed, printed, transmitted, communicated or processed information.

At step 501, data are gathered from different sources as previously discussed with regard to step 151. The process starts by applying established rock physics (step 502) to compute pore pressure and elastic properties using the logs available at the gathered wells or surface drilling data adequately processed. Some of the gathered data and rock physics results can be used to estimate regional stress and magnitude (step 503). The rock physics results in step 502 will also serve to define a 2D geomechanical layer 504 where all the subsequent calculations will be made to create the 2D maps of the induced seismicity potential proxy. If the data gathering in step 501 does not include 3D seismic (step 505), the process can use 2D structural maps (step 530) to compute structural derivatives (i.e., structural curvatures in step 531) that can serve as a proxy for the natural fracture data (step 540). If the data gathering step 501 includes 3D seismic (step 505), the process could be executed using mainly 2D maps without the need for 3D geocellular modeling.

At step 518, the 3D seismic could be used to compute average 2D maps representing average seismic attributes or extractions of 2D seismic maps from existing or computed 3D seismic attributes (step 518). These 2D seismic attribute extractions or averages could include structural attributes or other types of seismic attributes that could contain information about the natural fractures and could be used directly as a 2D seismic natural fracture proxy (step 519), which will be considered the 2D natural fracture model. The 2D average or extracted seismic attributes (step 518) could be used as constraints to build petrophysical, pore pressure and elastic models in step 520 using multiple reservoir modeling techniques that include deterministic, geostatistics, and artificial intelligence methods such as neural networks. The derived 2D elastic and petrophysical properties (step 520) could be used to derive 2D fracture models (step 521) using multiple fracturing modeling methods including neural networks that could find the relationship between any natural fracture measure at the wells and the available and derived 2D seismic attributes, petrophysical, and elastic properties.

At step 507, the 3D seismic could be used to compute a multitude of seismic attributes that will serve either as a direct 3D seismic fracture proxy in step 510 or be used as guides and constraints to building 3D elastic and petrophysical models in step 508 using multiple reservoir modeling techniques that include deterministic, geostatistics, and artificial intelligence methods such as neural networks. The derived 3D elastic and petrophysical properties 508 could be used to derive 3D fracture models 509 using multiple fracturing modeling methods including neural networks that could find the relationship between any natural fracture measure at the wells and the available and derived 3D seismic attributes, petrophysical, and elastic properties. The available 3D seismic fracture proxy in step 510 or derived 3D fracture model constrained by multiple 3D seismic attributes and petrophysical models in step 508 is either upscaled in the considered geomechanical layer or extracted along a representative interval of the subterranean formation in step 511 to provide the 2D natural fracture model in step 540. The 3D elastic properties in step 508 are also upscaled in the same geomechanical layer or extracted along the same representative interval of the subterranean formation.

At step 540, the 2D natural fracture model available in the geomechanical layer is converted into an equivalent fracture model in step 541, in which each fracture is represented by a length and an orientation. Both are then used as inputs into a meshless particle-based geomechanical simulator (step 542) able to represent the natural fractures as explicit continuous or discontinuous segments. After application of the regional stress 117 to the equivalent fracture model in step 541 and reaching a quasi-equilibrium state in step 542, the resulting stress field could be used to compute the stress and strain components used in calculating the induced seismicity potential (ISP) (step 543). These maps could be validated with actual seismicity data, if available. If no validation is possible, then the proxy maps could be used in injection site selection. The proper application of this proxy could provide an estimate of the extent of areas least likely to see preexisting stress fields perturbed through high volume injection (step 544), that can be used to select the best injection sites to reduce the potential for induced seismicity (step 545).

The above disclosure sets forth a number of embodiments of the present invention described in detail with respect to the accompanying drawings. Those skilled in this art will appreciate that various changes, modifications, other structural arrangements, and other embodiments could be practiced under the teachings of the present invention without departing from the scope of this invention as set forth in the following claims.

We claim:

1. A method for minimizing the risk of induced seismicity resulting from injection of fluids into a naturally fractured reservoir, said method comprising:
    creating an equivalent fracture model from data on the natural fracture density, regional stress, pore pressure and elastic properties of the reservoir, said equivalent fracture model having an array of points modeling an estimated fracture length and fracture orientation at corresponding points in the reservoir;
    simulating the geomechanical interaction between regional stress and natural fractures in the reservoir by a meshless particle-based method using the equivalent fracture model as an input to estimate the stress anisotropy and strain at points in the reservoir;
    calculating induced seismicity potential at points in the reservoir based at least in part on the estimated stress anisotropy and strain; and
    minimizing the risk of induced seismicity by selecting a site for injection of fluids into the reservoir by identifying a region of the reservoir having induced seismicity potential below a predetermined value.

2. The method of claim 1 wherein the stress anisotropy data comprises the local maximum principal stress direction at points in the reservoir.

3. The method of claim 1 wherein the strain data comprises shear strain at points in the reservoir.

4. The method of claim 1 further comprising the step of validating the estimated stress anisotropy and strain data against actual seismic data for the reservoir.

5. A method for minimizing the risk of induced seismicity resulting from injection of fluids into a naturally fractured reservoir, said method comprising:
    creating an equivalent fracture model from data on the natural fracture density, regional stress, pore pressure and elastic properties of the reservoir, said equivalent fracture model having an array of points modeling an estimated fracture length and fracture orientation at corresponding points in the reservoir;
    simulating the geomechanical interaction between regional stress and natural fractures in the reservoir by a meshless particle-based method using the equivalent fracture model as an input to estimate the differential stress and shear strain at points in the reservoir;
    calculating induced seismicity potential at points in the reservoir based at least in part on the estimated differential stress and shear strain; and
    minimizing the risk of induced seismicity by selecting a site for injection of fluids into the reservoir by identifying an area of the reservoir having induced seismicity potential below a predetermined value.

6. The method of claim 5 further comprising the step of validating the estimated differential stress and shear strain data against actual seismic data for the reservoir.

* * * * *